United States Patent
Har et al.

(10) Patent No.: US 8,223,860 B2
(45) Date of Patent: Jul. 17, 2012

(54) OFDM SYSTEM AND DATA TRANSMISSION METHOD THEREFOR

(75) Inventors: Dong-Soo Har, Gwangju (KR);
Eon-Pyo Hong, Gwangju (KR);
Jong-Yeop Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 490 days.

(21) Appl. No.: 12/482,859

(22) Filed: Jun. 11, 2009

(65) Prior Publication Data

US 2010/0272197 A1    Oct. 28, 2010

(30) Foreign Application Priority Data

Apr. 23, 2009  (KR) ...................... 10-2009-0035657

(51) Int. Cl.
*H04K 1/10* (2006.01)
*H04L 5/12* (2006.01)
(52) U.S. Cl. ...................................... 375/260; 375/259
(58) Field of Classification Search .................. 375/260
See application file for complete search history.

(56) References Cited

U.S. PATENT DOCUMENTS

| | | | | |
|---|---|---|---|---|
| 2005/0286648 A1* | 12/2005 | Feng et al. | .................... | 375/260 |
| 2008/0285432 A1* | 11/2008 | Ueng et al. | .................... | 370/203 |
| 2010/0077014 A1* | 3/2010 | Swan | ............................ | 708/318 |

FOREIGN PATENT DOCUMENTS

KR         10-0666689         1/2007

OTHER PUBLICATIONS

Dae-Woon Lim et al., "A new SLM OFDM scheme with low complexity for PAPR reduction," IEEE, Feb. 2005, pp. 93-96, vol. 12, Issue 2.

* cited by examiner

*Primary Examiner* — David C. Payne
*Assistant Examiner* — Erin File

(57) ABSTRACT

An OFDM system includes a frequency-time transformer configured to receive and transform input data to be transmitted to a time-domain sequence; a serial/parallel transformer configured to divide the time-domain sequence into plural sequences; a phase rotating module configured to perform phase rotation in respects to each of the divided time-domain sequences; and a minimum PAPR signal selector configured to select a sequence having a minimum peak-to-average power ratio (PAPR) among the sequences outputted from the phase rotating module.

10 Claims, 4 Drawing Sheets

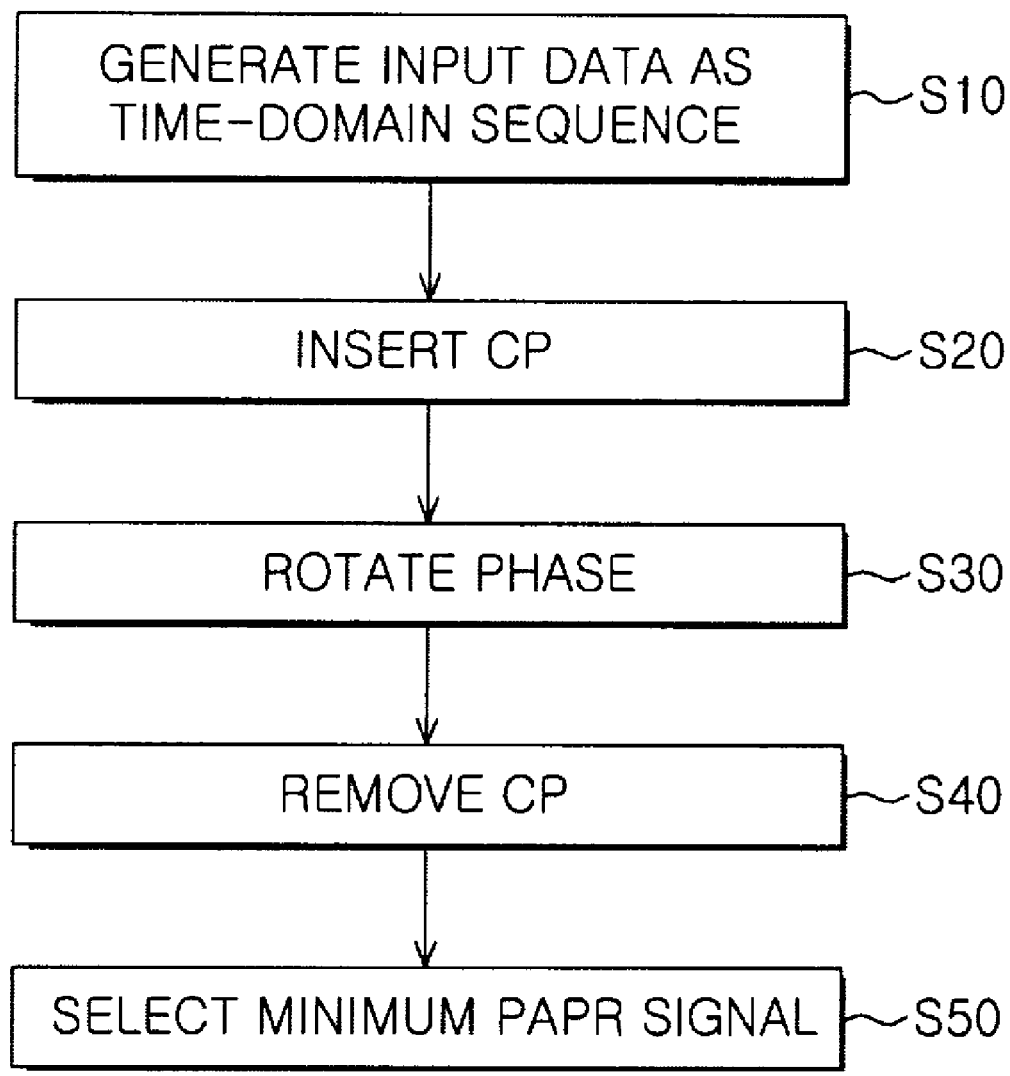

OFDM SYSTEM AND DATA TRANSMISSION METHOD THEREFOR

CROSS-REFERENCES TO RELATED PATENT APPLICATION

The present application claims priority under 35 U.S.C 119(a) to Korean Application No. 10-2009-0035657, filed on Apr. 23, 2009, in the Korean Intellectual Property Office, which is incorporated herein by reference in its entirety as set forth in full.

BACKGROUND

1. Technical Field

The embodiment described herein relates to a communication system and, more particularly, to an orthogonal frequency division multiplexing (hereinafter, referred to as 'OFDM') system and a data transmission method therefor.

2. Related Art

Since an OFDM system, which is suitable for high-speed data transmission in a wired and wireless channel, uses a plurality of subcarriers having inter-orthogonality, the OFDM system efficiently uses a frequency. A process of modulating and demodulating a plurality of carriers in a transmitter and a receiver has the same result as performing inverse fast Fourier transform (IFET) and fast Fourier transform (FET), thereby implementing high-speed data transmission and reception.

The OFDM system is adopted in various wireless communication applications such as digital audio broadcasting (DAB), terrestrial digital video broadcasting (DVB-T), European Telecommunications Standard Institute (ETSI) HIPERLAN/2 standard, Institute of Electrical and Electronics Engineers (IEEE) 802.11a standard for a wireless local area network (WLAN), IEEE 802.16a for a wireless metropolitan access network (WMAN), etc.

The OFDM system is high in spectral efficiency. The OFDM system can digitally implement modulation and demodulation units with efficiency and transmit data at high speed. On the contrary, a peak-to-average power ratio (hereinafter, referred to as 'PAPR') is high.

Most of wireless communication systems including the OFDM system use a high power amplifier (HPA) in order to acquire sufficient transmission power in the transmitter. In order to acquire peak output power from the HPA, an operating point must be established in the vicinity of a saturation region. As a result, the HPA has non-linear characteristics. Inter-modulation distortion and distortion of an undesirable band due to the non-linear characteristics of the HPA cause the PAPR to be increased. Moreover, the distortions and radiation cause high interference between adjacent channels as well as increasing a bit error ratio (BER).

In the OFDM system, the PAPR can represent a ratio of peak instantaneous power to average power of a transmission signal. General PAPR reducing methods adopt a method of reducing the peak instantaneous power. The method of reducing the PAPR can include a clipping method, a block coding method, a phase adjusting method, etc. Recently, as the method of reducing the PAPR, a selective mapping (SLM) method which is one of the phase adjusting methods has been widely used.

FIG. 1 is a block diagram illustrating a structure of an OFDM transmitter using an SLM method.

As shown in the FIG. 1, input data to be transmitted is divided into a plurality (M−1) of sequences in a serial/parallel transformer (S/P) 10. The divided sequences 'X(k)' are inputted into a phase rotating unit 12 and coupled with phase sequences '$\phi_m(k)$' (m=0, 1, . . . , M−1) so as to be generated as OFDM sequences '$X_m(k)$' of a frequency domain which are independent from each other. The OFDM sequences '$X_m(k)$' of the frequency domain re inputted into an inverse fast Fourier transformer 14 so as to be generated as OFDM sequences '$x_m(n)$' of a time domain. Thereafter, the OFDM sequences '$x_m(n)$' of the time domain are inputted into a minimum PAPR selection unit 16. Herein, any one sequence '$\chi_m^-(n)$' having the smallest PAPR is selected and transmitted.

As described above, in the SLM method, the OFDM sequences are rotated by multiplexing of plural complex numbers and IFFT computation. IFFT modules are needed as many as the sequences. As the number of carriers increases, the number of IFFT modules and a computing quantity in the IFFT modules increase. Consequently, complexity of the system increases, thereby deteriorating the performance of the system.

SUMMARY

An OFDM system and a data transmission method therefor that can reduce a computing quantity for signal modulation in the OFDM system are disclosed herein.

An OFDM system and a data transmission method therefor that can minimize the complexity of the OFDM system while reducing a PAPR are also disclosed herein.

In one aspect, an OFDM system includes a frequency-time transformer configured to receive and transform input data to be transmitted as a time-domain sequence; a serial/parallel transformer configured to divide the time-domain sequence into plural sequences; a phase rotating module configured to perform phase rotation in respects to each of the divided time-domain sequences; and a minimum PAPR signal selector configured to select a sequence having a minimum peak-to-average power ratio (PAPR) among the sequences outputted from the phase rotating module.

Meanwhile, in another aspect, a data transmission method for an orthogonal frequency division multiplexing (OFDM) system includes transforming input data to be transmitted to a time-domain sequence; dividing the time-domain sequence into plural sequences; rotating phases of the divided time-domain sequences and outputting the phase-rotated sequences; and selecting a sequence having a minimum peak-to-average power ratio (PAPR) among the phase-rotated sequences.

These and other features, aspects, and embodiments are described below in the section "Detailed Description."

BRIEF DESCRIPTION OF THE DRAWINGS

Features, aspects, and embodiments are described in conjunction with the attached drawings, in which:

FIG. 4 is a flowchart for illustrating a data transmission method for an OFDM system according to one embodiment.

DETAILED DESCRIPTION

Figure 1:
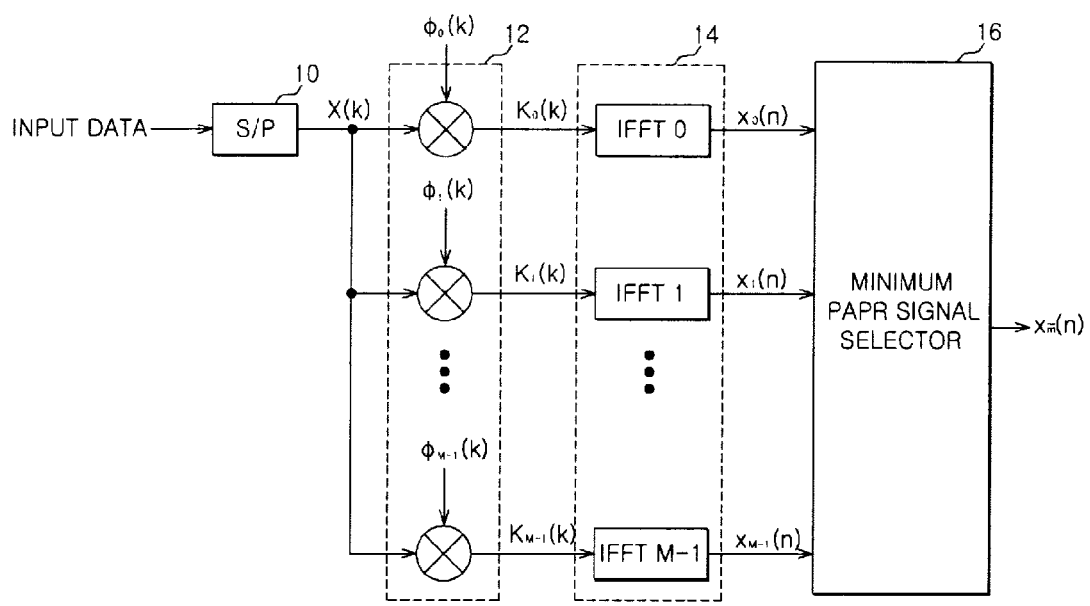
FIG. 1 is a block diagram illustrating a structure of an OFDM transmitter using an SLM method.
Figure 2:
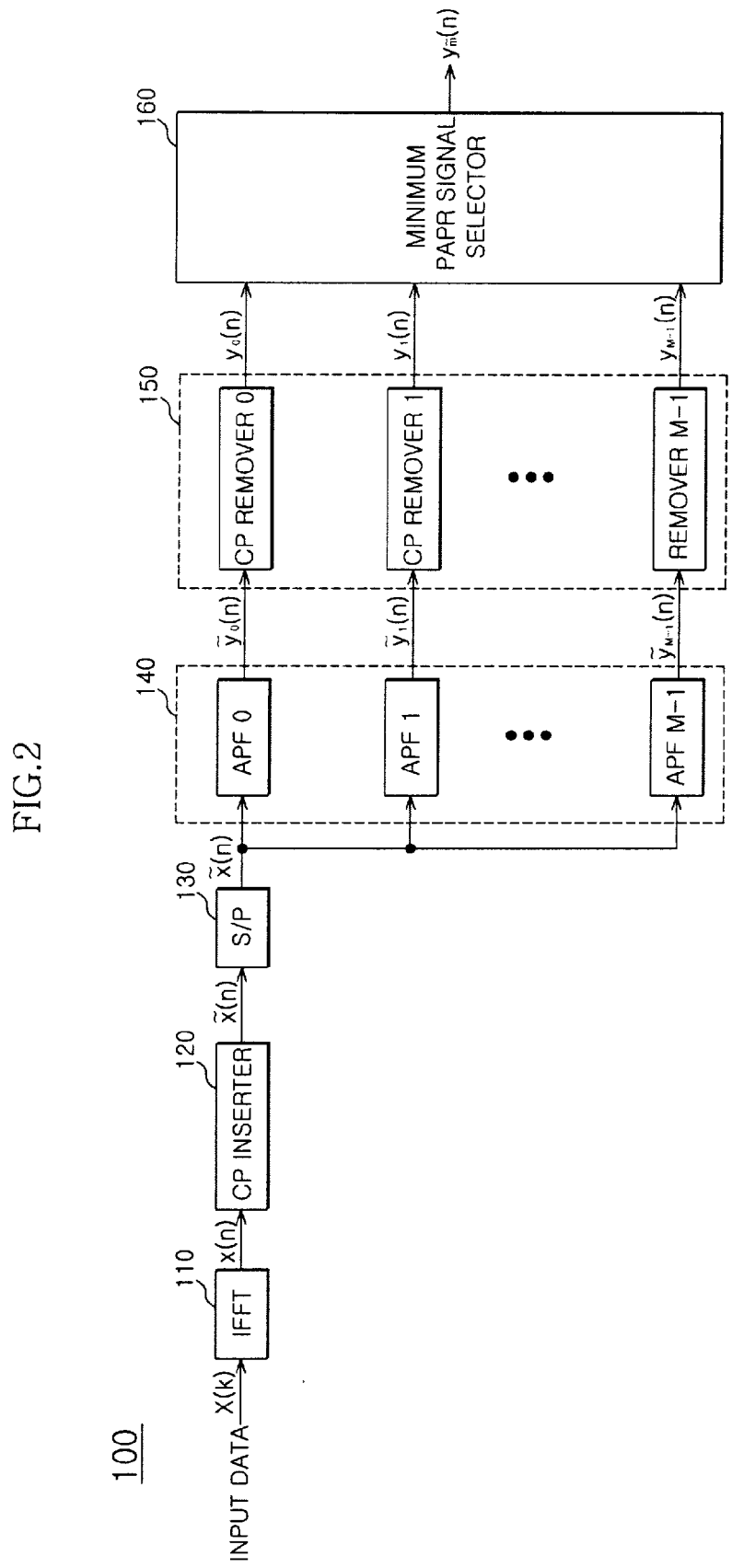
FIG. 2 is a structure diagram of an exemplary OFDM system according to one embodiment.

FIG. 2 is a structure diagram of an exemplary OFDM system according to one embodiment.

FIG. 2 illustrates a transmitter of an OFDM system 100. The OFDM system 100 can include an inverse fast Fourier transformer 110, a serial/parallel transformer (S/P) 130, a phase rotating module 140, and a minimum PAPR signal selector 160.

The inverse fast Fourier transformer 110 can operate as a frequency-to-time transformer that transforms input data to a sequence of a time domain. The serial/parallel transformer (S/P) 130 can divide the sequence of the time domain into plural numbers (M numbers). Moreover, the phase rotating module 140 can perform phase rotation in respects to each of the divided sequences of the time domain. Further, the minimum PAPR signal selector 160 can select and transmit a signal having a minimum PAPR among the sequences outputted from the phase rotating module 140.

In the preferred embodiment, phase rotating units constituting the phase rotating module 140 can each be constituted by an all-pass filter (APF).

However, sequences '$y_m^-(n)$', which ultimately transmitted from the transmitter of the OFDM system, correspond to circular convolutions between an input signal and an impulse response, while the APF performs linear convolutions between the input signal and the impulse response. Therefore, a process of making an output of each APF to be the same as a result performing the circular convolutions is needed. The process is possible by granting a protection band to the input signal, performing phase rotation of the input signal through the linear convolutions, and removing the protection band from the input signal.

For this, the OFDM system 100 can further include a cyclic prefix (CP) inserter 120 and a CP remover 150.

The CP inserter 120 can output time-domain sequences '$\tilde{x}(n)$' including the protection band by inserting the protection band into the sequences '$x(n)$' of the time domain, which are outputted from the inverse fast Fourier transformer 110. Meanwhile, the CP remover 150 can output sequences '$y_m(n)$' in which the protection band is removed from a signal '$\tilde{y}_m(n)$' that is outputted from the phase rotating module 140. Herein, the CP inserted into the protection band is a copy of the input signal '$x(n)$'.

As seen from FIG. 2, the OFDM sequence is transformed to the sequences of the time domain by performing IFFT before performing the phase rotation of the input signal. The signal having the minimum PAPR is selected after performing phase rotation of the sequences of the time domain.

In a known SLM method, since IFFT is performed in respects to each of the OFDM sequences after parallel-transforming the OFDM sequences, a computing quantity increases and as a result, system complexity increases. However, in the embodiment, an input signal of a frequency domain is transformed to a signal of the time domain by using one inverse fast Fourier transformer 110 before the input signal is parallelized.

Moreover, the protection band is inserted into the sequences transformed to the time domain and the phase rotation is performed through the linear convolutions with the impulse response. Thereafter, a result circularly convoluting the input signal and the impulse response is drawn by removing the protection band again.

Hereinafter, each APF constituting the phase rotating unit 140 will be described.

A system function of the APF is shown in [Equation 1].

$$H(z) = \prod_{k=1}^{K} \frac{z^{-1} - e_k^*}{1 - e_k z^{-1}} \qquad \text{[Equation 1]}$$

where $e_k$ denotes the k-th complex pole, $e_k^*$ denotes the complex conjugate of $e_k$, and k denotes the number of complex poles.

The phase response and the frequency response of the APF are expressed in Equation 2 and Equation 3. The time-domain OFDM sequence is expressed in Equation 4.

$$H_m(e^{j2\pi k/N}) \ (m = 0, 1, \ldots, M-1) \qquad \text{[Equation 2]}$$
$$(n = 0, 1, \ldots, N-1)$$

$$H_m(e^{j2\pi k/N}) \qquad \text{[Equation 3]}$$

$$y_m(n) = \frac{1}{\sqrt[2]{N}} \sum_{k=0}^{N-1} [X(k) e^{j' H_m(e^{j2\pi k/N})}] e^{j2\pi kn/N} \qquad \text{[Equation 4]}$$

where, n denotes the order of input signals to be transmitted at the time of transmitting total N input signals.

Since the frequency response substitutes for the phase sequence '$\phi_m(k)$' of the SLM method, phase rotation in respects to the input sequence becomes possible by using the APF.

However, the OFDM sequences '$y_m(n)$' to be transmitted correspond to the circular convolutions of the input sequences '$x(n)$' and the impulse response (see Equation 5), while the APF performs the linear convolutions. Therefore, the CP is again removed after inserting the CP into the input signal and performing the linear convolutions in order to make the result of the APF to be the same as the circular convolutions.

$$h_m(n) = \frac{1}{\sqrt[2]{N}} \sum_{k=0}^{N-1} H_m(e^{j2\pi kn/N}) e^{j2\pi kn/N} \qquad \text{[Equation 5]}$$

In the preferred embodiment, the CP inserted so that the phase rotating unit 140 linearly convolutes the input signal and the impulse response must secure sufficient length '$N_C$' so as to maintain signals before and after the linear convolutions in the same state.

In order to determine the length '$N_C$' of the CP, effective length '$N_e$' of an impulse response '$h_m(n)$', which ultimately decreases should be considered.

$$N_e = \sqrt[2]{\frac{1}{E} \sum_{n=0}^{\infty} n^2 |h_m(n)|^2} \qquad \text{[Equation 6]}$$

In Equation 6, E denotes total energy $$E = \sum_{n=0}^{\infty} |h_m(n)|^2,$$

of the impulse response.

The circular convolutions '$y_m(n)$' of the input signal '$x(n)$' and the impulse response '$h_m(n)$' are expressed in Equation 7 and the output sequences '$\tilde{y}_m(n)$' which is the linear convolutions of the input signal '$\tilde{x}(n)$' and the impulse response '$h_m(n)$' in the APF are expressed in Equation 8.

$$y_m(n) = \overset{N_e-1}{\underset{k=0}{Q}} h_m(k)x((n-k) \mod N) \quad \text{[Equation 7]}$$

$$\tilde{y}_m(n) = \sum_{k=0}^{N_e-1} h_m(k)\tilde{x}(n-k) \quad \text{[Equation 8]}$$

The input sequences '$\tilde{x}(n)$' must be equal to (x(n) module N) when $-N_e+1 \leq n \leq N-1$ so that the linear convolutions '$\tilde{y}_m(n)$' and the circular convolutions '$y_m(n)$' are equal to each other. Meanwhile, since the CP is a copy of the input signal 'x(n)', the CP has a relationship of $N-N_C \leq n \leq N-1$, the length '$N_C$' of the CP must satisfy Equation 9.

$$N_C \geq N_e - 1 \quad \text{[Equation 9]}$$

Meanwhile, candidate sequences inputted into the minimum PAPR signal selector 160 must have low cross-correlation in order to acquire necessary PAPR reduction performance. Cross-correlation of a pair of candidate sequences '$y_p(n), y_q(n)$' ($0 \leq p, q \leq M-1$) is expressed in Equation 10 when $-(N-1) \leq d \leq N-1$.

$$R_{pq}(n,n+d) = E[y_p(n)y_q^*(n+d)] \quad \text{[Equation 10]}$$

where, when Equation 4 is applied, the cross-correlation shown in Equation 11 can be acquired.

$$R_{pq}(n, n+d) = \frac{1}{N} \overset{N-1}{\underset{k=0}{Q}} \overset{N-1}{\underset{l=0}{Q}} E[X(k)X^*(l)] \quad \text{[Equation 11]}$$
$$e^{j('H_p(e^{j2\pi k/N}) - 'H_q(e^{j2\pi l/N}))} e^{-j2\pi kd/N}$$

In Equation 11, it can be assumed that the cross-correlation is independent from a variable n and a frequency domain symbol 'X(k)' is a random sequence having an independent and constant distribution, of which an average is 0 and a distribution is 1.

Therefore, cross-correlation of a pair of adjacent candidate sequences can be again prepared as expressed in Equation 12.

$$R_{pq}(d) = \overset{N-1}{\underset{k=0}{Q}} e^{j('H_p(e^{j2\pi k/N}) - 'H_q(e^{j2\pi l/N}))} e^{-j2\pi kd/N} \quad \text{[Equation 12]}$$

In order to consider all adjacent pair of candidate sequences, variance of correlation (VC) can be defined as expressed in Equation 13.

$$VC = \left( \underset{0 \leq p < q \leq M-1}{Q} \text{Var}[|R_{pq}(d)|^2]_{d=-(N-1)}^{N-1} \right) \Big/ \binom{n}{k} \quad \text{[Equation 13]}$$

where, $$\binom{n}{k}$$

denotes the predetermined number of pairs of p and q. Moreover, $\text{Var}[|R_{pq}(d)|^2]_{d=-(N-1)}^{N-1}$ is $$\frac{1}{N} \overset{N-1}{\underset{d=-(N-1)}{Q}} \left( |R_{pq}(d)|^2 - E[|R_{pq}(d)|^2]_{d=-(N-1)}^{N-1} \right)^2,$$

and $E[|R_{pq}(d)|^2]_{d=-(N-1)}^{N-1}$ as a sample average of $|R_{pq}(d)|^2$ can be expressed as $$E[|R_{pq}(d)|^2]_{d=-(N-1)}^{N-1} = \frac{1}{N} \overset{N-1}{\underset{d=-(N-1)}{Q}} |R_{pq}(d)|^2.$$

The variance of correlation of Equation 13 is a representative value of the cross-correlation of all pairs of candidate sequences. Therefore, it is preferable to select an APF having a low VC value in order to maximize the PAPR reduction performance.

In brief, the cross-correlation of adjacent pairs of candidate sequences must be low in order to reduce the PAPR and the cross-correlation of each pair of sequences may be representative as the variance of correlation (VC), such that a filter having a phase response in which the variance of correlation (VC) of the adjacent pairs of sequences has a minimum value is selected.

In order to solve a problem in that the system complexity increases by inverse fast Fourier transform of a plurality of parallel-transformed sequences, after input data is transformed to time-domain sequences and phase rotation in respects to the time-domain sequences is performed.

Accordingly, since the number of inverse fast Fourier transforming module for transforming the input data to the time-domain sequences can be remarkably reduced, it is possible to minimize the system complexity.

Moreover, the all-pass filter is used for phase rotation of the sequences that are transformed to the time domain. In order to draw the same result as the circular convolutions in respects to the input signal, the linear convolutions are performed by inserting the protection band into the input signal of the all-pass filter and then the protection band is removed.

The protection band inserted into the input signal of the all-pass filter is a copy of the input signal. Therefore, the protection band must have sufficient length in order to prevent interference with an adjacent signal. For this, the length of the protection band is determined by considering effective length of the impulse response of the all-pass filter.

In addition, the all-pass filter having a phase response in which the variance of correlation that is the representative value of the cross-correlation has a lowest value is selected, such that candidate sequences outputted from the all-pass filter have low cross-correlation.

In the OFDM system using the SLM method and the OFDM system according to the embodiment, Table 1 expresses a computing quantity depending on a division sequence of the input signal and a computational complexity reduction ratio (CCRR) when N=2048 and $N_C$=128.

TABLE 1

| Parameters | | SLM | Proposed | CCRR |
|---|---|---|---|---|
| M = 2 | K = 1 | 106496 | 62464 | 41.3% |
| | K = 3 | 106496 | 97280 | 8.7% |
| | K = 5 | 106496 | 132096 | −24.0% |

TABLE 1-continued

| Parameters | | SLM | Proposed | CCRR |
|---|---|---|---|---|
| M = 4 | K = 1 | 212992 | 79872 | 62.5% |
| | K = 3 | 212992 | 149506 | 29.8% |
| | K = 5 | 212992 | 219136 | −2.9% |
| M = 8 | K = 1 | 425984 | 114688 | 73.1% |
| | K = 3 | 425984 | 253952 | 40.4% |
| | K = 5 | 425984 | 393216 | 7.7% |

As seen from Table 1, the computing quantity has a lowest value in comparison with the SLM method when M=8 and K=1.

Figure 3:
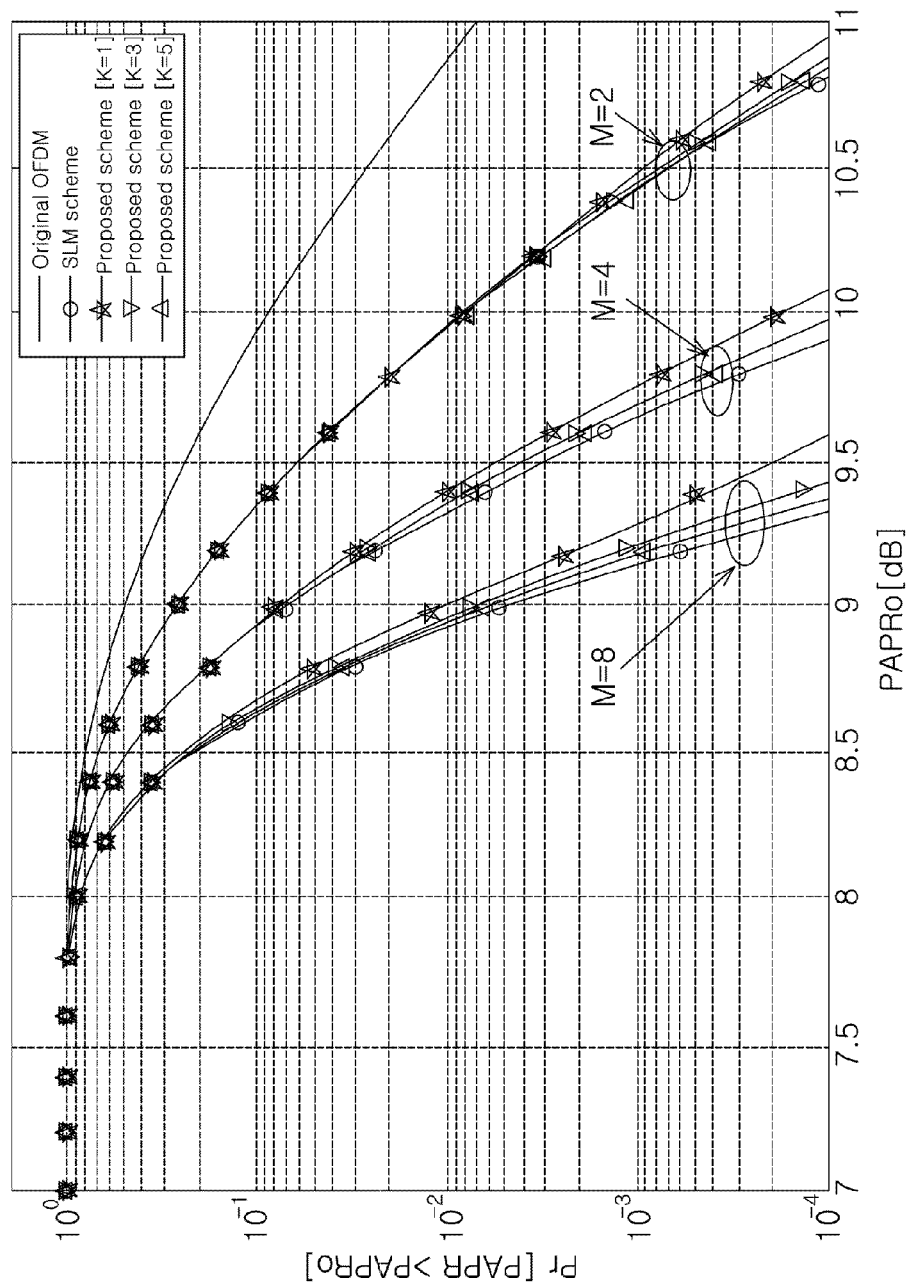
FIG. 3 is a graph for comparing PAPR reduction performance in an OFDM system according to one embodiment.

FIG. 3 is a graph for comparing PAPR reduction performance in an OFDM system according to one embodiment.

In order to compare the PAPR reduction performance, 2048 carriers (N=2048) and a 16-quadrature amplitude modulation (QAM) method are adopted. Moreover, first, third, and fifth output signals of the phase transformer are observed in respects to second, fourth, and eighth sequences for each OFDM system.

The graph of FIG. 3 illustrates a probability in which PAPR of each sequence will be larger than a threshold PAPR ($PAPR_0$) in an original OFDM system that does not adopt a PAPR reducing method, the OFDM system adopting the SLM method and the OFDM system according to the embodiment.

Referring to FIG. 3, when K=5, the PAPR reduction performance of the OFDM system according to the embodiment is substantially similar to that of the OFDM system using the SLM method.

When M=8 and K=1, the OFDM system adopting the SLM method can acquire a PAPR lower than the OFDM system according to the embodiment by 0.25 dB, but in the case of the OFDM system according to the embodiment, the computing quantity can be decreased to about 73.1%. Further, when M=4 and K=1, the PAPR increases by 0.16 dB, while the computing quantity can be decreased to about 62.5%.

FIG. 4 is a flowchart for illustrating a data transmission method for an OFDM system according to one embodiment.

First, in order to transmit data by using an OFDM system, input data are transformed to sequences in a time domain (S10). That is, the input data 'X(k)' is transformed to the sequences 'x(n)' in the time domain by inverse fast Fourier transform.

Next, phase rotation in respects to divided sequences is performed by serial/parallel transforming the sequences 'x(n)' in the time domain (S30). An all-pass filter can be used during the phase rotation.

After the phase rotation is completed, a signal having the lowest PAPR is selected and transmitted among a plurality of sequences that are phase-rotated (S30).

In the preferred embodiment, in the case of performing the phase rotation by using the all-pass filter, a step (S20) of inserting a protection band (CP) into the input data can precede before performing the phase rotation in order to compensate a linear convolution characteristic of the APF.

Sequences '$\tilde{x}(n)$' into which the protection band CP is inserted are inputted into the all-pass filter and linear convolutions are performed depending on an impulse response function of the all-pass filter, such that phases of the sequences are rotated.

Sequences '$\tilde{y}_m(n)$' of which phases are rotated are outputted as OFDM sequences '$y_m(n)$' from which the protection band (CP) is removed (S40), such that signals before and after the phase rotation are equal to each other.

After the protection band is removed from each sequence, any one sequence having the lowest PAPR is selected by comparing the PAPRs of the sequences. In addition, the selected sequences '$y_m^-(n)$' are transmitted to a receiver.

As described above, the length of the protection band which is inserted into the sequences inputted for the phase rotation is determined by considering an effective length of the impulse response of the all-pass filter. In addition, an all-pass filter having a phase response in which a variance of correlation that is a representative value of cross-correlation has a lowest value is selected, such that candidate sequences outputted from the all-pass filter have low cross-correlation.

While certain embodiments have been described above, it will be understood to those skilled in the art that the embodiments described are by way of example only. Accordingly, the apparatus described herein should not be limited based on the described embodiments. Rather, the apparatus described herein should only be limited in light of the claims that follow when taken in conjunction with the above description and accompanying drawings.

What is claimed is:

1. An orthogonal frequency division multiplexing (OFDM) system, comprising:
    a frequency-time transformer configured to receive and transform input data into a time-domain sequence;
    a cyclic prefix (CP) inserter configured to insert a protection band into the time-domain sequence;
    a serial/parallel transformer configured to divide the time-domain sequence including the protection band into first sequences;
    a phase rotating module configured to perform phase rotation on each of the first sequences to output phase rotated sequences;
    a CP remover configured to remove the protection band from the phase rotated sequences and to output second sequences; and
    a minimum peak-to-average power ratio (PAPR) signal selector configured to select a second sequence having a minimum PAPR from among the second sequences outputted from the CP remover.

2. The OFDM system according to claim 1, wherein the phase rotating module includes a plurality of all-pass filters that output the phase rotated sequences after receiving the first sequences.

3. The OFDM system according to claim 2, wherein a length $N_C$ of the protection band is set as $N_C \geq N_e - 1$ when an effective length of an impulse response of the all-pass filter is set to Ne.

4. The OFDM system according to claim 2, wherein the all-pass filter has a phase response in which a variance of correlation (VC) has a lowest value with respect to adjacent pairs of phase rotated sequences outputted from the all-pass filter.

5. The OFDM system according to claim 1, wherein the frequency-time transformer comprises an inverse fast Fourier transformer.

6. A data transmission method for an orthogonal frequency division multiplexing (OFDM) system, the method comprising:
    transforming input data into a time-domain sequence;
    inserting a protection band into the time-domain sequence;
    dividing the time-domain sequence including the protection band into first sequences;
    rotating phases of the first sequences and outputting phase-rotated sequences;
    removing the protection band from the phase-rotated sequences and outputting second sequences; and selecting a second sequence having a minimum peak-to-average power ratio (PAPR) from among the second sequences.

7. The data transmission method according to claim 6, wherein outputting the phase-rotated sequences comprises filtering the plural sequences with an all-pass filter.

8. The data transmission method according to claim 7, wherein a length $N_C$ of the protection band is set as $N_C \geq N_e - 1$ when an effective length of an impulse response of the all-pass filter is set to Ne.

9. The data transmission method according to claim 7, wherein the all-pass filter has a phase response in which a variance of correlation (VC) has a lowest value with respect to adjacent pairs of sequences outputted from the all-pass filter.

10. The data transmission method according to claim 6, wherein transforming the input data into the time-domain sequence comprises performing inverse fast Fourier transform on the input data.

* * * * *